US012077162B2

(12) United States Patent
Preuss et al.

(10) Patent No.: US 12,077,162 B2
(45) Date of Patent: Sep. 3, 2024

(54) SYSTEM AND METHOD FOR TRANSFERRING DIFFERENT SETTINGS BETWEEN VEHICLES OF DIFFERENT TYPES

(71) Applicant: Harman Becker Automotive Systems GmbH, Karlsbad (DE)

(72) Inventors: Stephan Preuss, Schwabhausen (DE); Carolin Andrea Caparelli, Stuttgart (DE); Nicolas Olivier Sébastien Villiers, Munich (DE)

(73) Assignee: HARMAN BECKER AUTOMOTIVE SYSTEMS GMBH, Karlsbad (DE)

( * ) Notice: Subject to any disclaimer, the term of this patent is extended or adjusted under 35 U.S.C. 154(b) by 398 days.

(21) Appl. No.: 17/383,068

(22) Filed: Jul. 22, 2021

(65) Prior Publication Data

US 2022/0024460 A1 Jan. 27, 2022

(30) Foreign Application Priority Data

Jul. 27, 2020 (DE) .......................... 102020119774.8

(51) Int. Cl.
*B60W 40/08* (2012.01)
*B60R 16/037* (2006.01)

(52) U.S. Cl.
CPC ........... *B60W 40/08* (2013.01); *B60R 16/037* (2013.01); *B60W 2540/043* (2020.02); *B60W 2556/45* (2020.02)

(58) Field of Classification Search
CPC ........... B60W 40/08; B60W 2540/043; B60W 2556/45; B60R 16/037

See application file for complete search history.

(56) References Cited

U.S. PATENT DOCUMENTS

| | | | |
|---|---|---|---|
| 2016/0167608 A1* | 6/2016 | Rai | H04L 67/12 701/36 |
| 2018/0319405 A1* | 11/2018 | Heinze | B60W 30/143 |
| 2019/0039627 A1* | 2/2019 | Yamamoto | B60W 30/18163 |
| 2020/0207375 A1* | 7/2020 | Mehta | G06V 20/56 |
| 2020/0223444 A1* | 7/2020 | Bonanni | G06T 19/006 |
| 2020/0285846 A1* | 9/2020 | Yamanaka | G06V 20/56 |
| 2022/0153279 A1* | 5/2022 | Atsmon | B60W 50/0097 |

FOREIGN PATENT DOCUMENTS

| | | |
|---|---|---|
| DE | 102012220655 A1 | 5/2013 |
| DE | 102014215117 A1 | 2/2015 |
| DE | 102018122188 A1 | 3/2019 |
| EP | 2284491 A1 | 2/2011 |

* cited by examiner

*Primary Examiner* — Behrang Badii
*Assistant Examiner* — Jay Khandpur
(74) *Attorney, Agent, or Firm* — McCoy Russell LLP (57) ABSTRACT

A computer-implemented method for configuring one or more systems related to the operation of a vehicle includes: in response to receiving input data indicative of a user being about to initiate an operation of the vehicle: determining an identity of the user, loading first data representative of one or more mapping rules from a first memory device, selecting and loading second data representative of one or more generic settings from a second memory device, wherein selecting the data is based on the identity of the user, transforming, based on the mapping rules, the generic settings into vehicle-specific settings, and configuring, based on the vehicle-specific settings, the one or more systems related to the operation of the vehicle.

19 Claims, 4 Drawing Sheets

SYSTEM AND METHOD FOR TRANSFERRING DIFFERENT SETTINGS BETWEEN VEHICLES OF DIFFERENT TYPES

CROSS-REFERENCE TO RELATED APPLICATIONS

The present application claims priority to German Patent Application No. 102020119774.8, entitled "System and Method for Transferring Different Settings between Vehicles of Different Types," and filed Jul. 27, 2020. The entire contents of the above-listed application are hereby incorporated by reference for all purposes.

FIELD

The present disclosure relates to systems, methods, and devices for transferring different settings between vehicles of different types. The disclosure is applicable in the field of electronics, in particular automotive electronics.

BACKGROUND

Similar methods for configuring one or more devices comprised in a vehicle based on externally supplied settings are known in the art.

Known methods allow providing different settings for a car, in order to allow a plurality of users who share the same vehicle to have on-board devices configured automatically to their preferences once they enter the vehicle to initiate operation.

For example, EP 2 284 491 B1 discloses a key of a vehicle, wherein the key comprises a memory storing data for a navigation device of the vehicle wherein the data comprise instructions for execution by the navigation device and/or map data to be used by the navigation device.

However, known methods are limited to applying different sets of preferences related to different users to one and the same car. They are, however, not suitable for allowing one or more users to use a plurality of vehicles of different manufacturers, types, and models and have on-board devices and other systems related to the operation of the car, such as network services used by the vehicle electronics, automatically configured to their preferences. Using known methods, it is furthermore impossible to provide automatic configuration when a user initiates operation of a vehicle he has never used before.

Embodiments of the present disclosure may serve to mitigate these disadvantages.

SUMMARY

In a first aspect of the disclosure, a computer-implemented method for configuring one or more systems related to the operation of a vehicle is disclosed.

In response to receiving input data indicative of a user being about to initiate an operation of the vehicle, an identity of the user is determined, first data representative of one or more mapping rules are loaded from a first memory device, and second data representative of one or more generic settings are selected and loaded from a second memory device, wherein selecting the data is based on the identity of the user. Further in response to receiving input data indicative of a user being about to initiate an operation of the vehicle, the generic settings are transformed, based on the mapping rules, into vehicle-specific settings, and the one or more systems of the vehicle are configured, based on the vehicle-specific settings.

The method is initiated the moment when a user is about to initiate operation of a vehicle, for example when he unlocks and/or opens a door of the vehicle. The user may be identified using biometrics, e.g. by a fingerprint reader. Alternatively, a user identification code may be stored in a token in possession of the user, e.g. a mobile device. Thereby, the user is identified automatically, and the method continues without interaction with the user. The method may begin any time when a system executing the method receives an input that the next user of the vehicle is determined. The input may already comprise the identification. For example, when a client of a vehicle rental provider chooses a specific vehicle, e.g. at the provider's counter, the input that a user is about to initiate operation may be sent to the vehicle, together with the user identification. In that case, the step of identifying the user consists in the reception of the user identification data. In another example, the usage of a vehicle by different users at different times may be scheduled in advance. In that case, the steps of the method may be executed any time between the moment when the previous user terminates usage of the vehicle, and the moment when the user initiates usage of the vehicle.

The user may be the driver of the vehicle or a passenger. The steps of the method can be executed in parallel, and independently, for a plurality of users at the same time. Thereby, the driver and several passengers can be identified and devices and/or systems related to them, e.g. their seats, can be configured simultaneously.

The generic settings correspond to the user's preferences. The generic settings are stored in an abstract data format that is not specific to a vehicle type. The data may be stored in a network-accessible storage, so that they are transferable from one vehicle to another. The network may be a cellular telephone network, a satellite connection, a wireless local area network, an Ethernet connection, a Universal Serial Bus connection, a Near Field Communication connection, a Bluetooth connection, or any other computer network technology. The vehicles may form part of a fleet of vehicles, such as the car pool of a company or of a car sharing provider. However, this need not be the case: It is only necessary that a computer program, configured to execute at least a part of the steps of the method, be installed on an on-board computer comprised in the vehicle. The vehicles suitable for application of the method are not limited to vehicles and systems of one and the same type. Steps of the method, in particular translation, may also be executed by a computer device not comprised in the vehicle, e.g., a network-accessible server, or a mobile device.

For example, the generic settings may comprise anatomic data of a user, such as the height of his eye level when he is seated. Transforming this setting into a vehicle specific setting yields a position value to which the servo motor moving the seat up and down to ensure that a user with the corresponding data is located so that his eyes are at the appropriate height to have a good vision of the traffic situation outside the vehicle. Therefore, the vehicles and systems, i.e. seat and servo motor, may be of entirely different types. The user may benefit from automatic configuration according to the present disclosure even when changing from a compact car to a truck, and find all settings (seat, air conditioning, multimedia) set accordingly. This improves both comfort and safety, because the driver is not distracted with changing settings while driving. Therefore, the user can focus better on the traffic. If the user is driving a vehicle of a type unknown to him for the first time, he will not need to familiarize himself with the user interface.

The mapping rules, stored in the first memory device, which may be comprised in the vehicle, may have the form of analytic functions, heuristic algorithms, neural networks, or of mapping tables. A heuristic algorithm can consist of a plurality of rules that are applied based on the input data. In another exemplary embodiment, the first memory device may be comprised in a network server, e.g. in a cloud, or in a mobile device. The step of transforming may refer to translating a value from a generic scale to a vehicle-specific scale by an analytic function or a mapping table, or execution of a heuristic algorithm or neural network. Examples for settings are radio station pre-sets, audio settings, a list of previous navigation destinations, a user interface language, a cabin temperature, values for a seat position.

In an embodiment, the second memory device is a remote network-accessible storage, and/or comprised in a mobile device. This facilitates management and data security. The storage is independent from the car, and the settings are preserved if the vehicle is sold or scrapped. The use of a mobile device allows using the system without internet access, and increases data confidentiality. Furthermore, an application software may allow the user to further configure the execution of the method. For example, a user may prefer to have the driver's seat and the mirrors automatically configured according to the present disclosure, but to configure the audio system manually. In an exemplary embodiment, the application software may be executed on a mobile device, on a stationary computer, on a computer comprised within the vehicle, and/or a network server, configurable by a web interface.

In an embodiment, the method further comprises in response to receiving an input indicative of the user modifying vehicle-specific settings related to the one or more systems related to the operation of the vehicle, transforming the modified vehicle-specific settings into modified generic settings based on the mapping rules, and storing data representative of the modified generic settings in the second memory device.

These steps allow determining the generic settings. The user determines the settings in a vehicle, for example, he adjusts the height of his seat so that he has a comfortable position and a good vision of the surrounding traffic, thereby modifying a vehicle-specific setting. In response to that, the modified vehicle-specific setting is transformed into a modified generic setting based on the mapping rules, and the modified generic setting is stored in the second memory device. The modified generic setting may later be used to configure devices in another vehicle, when the same user is about to initiate operation of another vehicle. This procedure for updating values has the advantage that the generic settings need not be predefined, but are automatically transferred.

In an embodiment, the method further comprises: periodically and/or in response to receiving an input indicative of the user terminating the operation of the vehicle: determining current vehicle-specific settings based on a current configuration of the one or more systems, transforming the current vehicle-specific settings into modified generic settings based on the mapping rules, and storing data representative of the modified generic settings in the second memory device.

In an embodiment, the first memory device is comprised in the vehicle. Thereby the mapping rules are available also in case of an outage of an internet connection.

In another embodiment, the first memory device is comprised in a network-accessible server. This facilitates easier maintenance of the system. In another embodiment, the first memory device is comprised in a mobile device.

In an embodiment, configuring the one or more systems is further based on data generated by a sensor comprised in or attached to the vehicle. This allows further customization. If for example, a user prefers driving a convertible with the roof open, then the system may keep the roof closed in case of bad weather. The configuration of the one or more systems can also depend on any kind of contextual data. For example, information on the weather, obtained from a weather forecast or report via a network connection can be used to determine temperature settings. Alternatively, information on air pollution, e.g. by pollen, may be retrieved via the internet and the ventilation system may be opened or closed based on that data. In another embodiment, contextual information may be related to the user of the vehicle. For example, data may be received on a preceding activity of the user. If, e.g., the user has been exercising before driving, he may prefer the heating and/or air conditioning set to a lower temperature. Such information may be processed using, e.g. a functional relation, a mapping table, a heuristic, or an artificial neural network. This allows also adapting the method to other parameters, such as time, geographical region, weather, schedule, preceding or upcoming user activities, number and type of passengers.

In an embodiment, the step of transforming the generic settings into vehicle-specific settings and/or the step of transforming the vehicle-specific settings into generic settings is executed by a network-accessible remote computer. Thereby, the computing capabilities on a server are used, rather than relying on an on-board computer.

In an embodiment, the step of transforming the generic settings into vehicle-specific settings and/or the step of transforming the vehicle-specific settings into generic settings is executed by a mobile remote computing device. Thereby, relying on an on-board computer is avoided.

In an embodiment, the generic settings comprise one or more of multimedia system settings, navigation system settings, language settings of a user interface, and heating and/or air conditioning settings. The present disclosure is, however, not limited to these settings. Rather, settings for any configurable service, device, or other system related to the operation of the vehicle may be transformed.

In an embodiment, the mapping rules comprise mapping tables and/or analytic functions. A mapping table is advantageous if the vehicle-specific setting consists of discrete values. The mapping table comprises pairs of values, namely all possible values of the vehicle-specific setting (such as step motor positions for the servo motor that sets the height of a seat), and the corresponding generalized settings (such as the distance between the seat surface and a level at which the eyes of the driver should be). In case of continuous values (if the servo motor is continuously movable), the mapping rule may consist of an analytic function and coefficients, so that an unambiguous relation between the generic setting and the vehicle-specific setting is established. The function is used to transform the values. Alternatively, an artificial neural network may be used as a mapping rule. It is initially and/or continuously trained on a training data set comprising correct value pairs. It then allows transforming data.

In an embodiment, the method further comprises the steps of determining whether the first data representing mapping rules are valid, and in response to determining that the first data representing the mapping rules are not valid:

determining an identity of the user,
storing vehicle-specific settings in the first memory device in response to the settings being modified by the user,
in response to detecting a trigger event, wherein the trigger event comprises one out of receiving a user input, a predetermined time period elapsing, or receiving an input indicative of the user terminating the operation of the vehicle:
selecting and loading second data representative of one or more generic settings from a second memory device, wherein selecting the data is based on the identity of the user,
storing a dataset comprising pairs of generic settings and corresponding vehicle-specific settings in a third memory comprised in a network-accessible server,
determining, by the network-accessible server, mapping rules for transforming generic settings into vehicle-specific settings, such that the mapping rules approximate the dataset, and
storing the mapping rules in the first memory.

These steps allow the automatic determination of the mapping rules. If mapping rules are available, either in a memory comprised in the vehicle or a remote memory, these steps need not be executed. In response to a determination that no mapping rules are available, the systems are not configured automatically. Optionally, an indication is provided to the user that no automatic configuration is available.

Additionally and/or alternatively, the mapping rules may be created by a manufacturer of the vehicle, or by a third party operator or car sharing provider.

The trigger event defines a moment in time when a sufficient amount of vehicle-specific settings are collected. In an embodiment, the trigger is a user input indicative of manual configuration being finished. Alternatively, the trigger event is the end of a predetermined time period. This is a time when, after initiating operation, the user is expected to have found a convenient setting. The trigger event can also be repeated periodically. Alternatively, the trigger event is the reception of an input indicative of the user terminating operation of the vehicle.

The process for determining mapping rules is executed separately and/or in parallel for each setting of a device and/or system. No mapping rules are determined for settings for which the user has not modified any settings. In response to the trigger event, the second data representing the corresponding generic settings for the user are selected and loaded.

A server collects data points from one or more vehicles and a plurality of users. Each data point consists of a vehicle specific setting and the corresponding generic setting. Based on the data sets, mapping rules are determined such that they approximate the data set.

In a further embodiment, determining mapping rules may be executed as a two-step process by the server: First, a set of parameters for a predetermined functional relation between a generic setting and a vehicle-specific setting are determined by fitting the function to the data set using, e.g., a linear regression. This functional relation approximates the dataset. Additionally, a confidence value may be determined to determine whether the mapping rule is reliable. Optionally, the mapping rule may be converted by the network-accessible server into a mapping table. Finally, the mapping rule is stored in the first memory. In particular, this means that the rule can be distributed to the on-board computers of all vehicles of the relevant type that comprise devices of the relevant type.

In an embodiment, the step of selecting and loading second data representative of one or more generic settings from a second memory device is further based on third data indicative of a selection by the user whether or not a configuration is to be effected. This increases the flexibility of the method. Translation may also depend on, e.g., car make, car model, trim level of the car, and/or user properties.

In an embodiment, the method further comprises determining whether the second data representing generic settings are available, in response to a determination that the second data representing generic settings are not available, determining whether data related to preferences and/or properties of the user are available, and in response to a determination that data related to preferences and/or properties of the user are available: transforming the data related to preferences and/or properties of the user into generic settings, and storing the generic settings in the second memory device.

Thereby, generic settings for a new user are determined. The data related to preferences and/or properties of the user may be anatomic data, such as height and other measures. The data may have the form of clothing sizes, and/or the form of a photograph of the user. The data are then transformed into generic settings using a set of rules, such as mapping tables, heuristic algorithms, functional relations, and/or artificial neural networks. The transformation may further include using data and settings of other users. For example, a user with similar body dimensions may be determined, and the generic settings related to seat and mirrors may be copied. Thereby, a first set of generic settings is determined, and the user need only make minor adjustments. This allows automatic configuration in the case that a new user is using the system described by the method for the first time.

In a second aspect of the present disclosure, a system for configuring one or more systems related to the operation of a vehicle is disclosed. The system is configured to, in response to receiving input data indicative of a user being about to initiate an operation of the vehicle:
determining an identity of the user,
loading, from a first memory device, first data representative of one or more mapping rules,
selecting and loading, from a second memory device, second data representative of one or more generic settings, wherein selecting the data is based on the identity of the user,
transforming, based on the mapping rules, the generic settings into vehicle-specific settings, and
configuring, based on the vehicle-specific settings, the one or more systems related to the operation of the vehicle.

All embodiments and properties of the first aspect of the disclosure are also applicable to the second aspect of the disclosure.

DESCRIPTION OF THE DRAWINGS

The features, objects, and advantages of the present disclosure will become more apparent from the detailed description set forth below when taken in conjunction with the drawings in which like reference characters identify correspondingly throughout and wherein.

DETAILED DESCRIPTION

Figure 1:
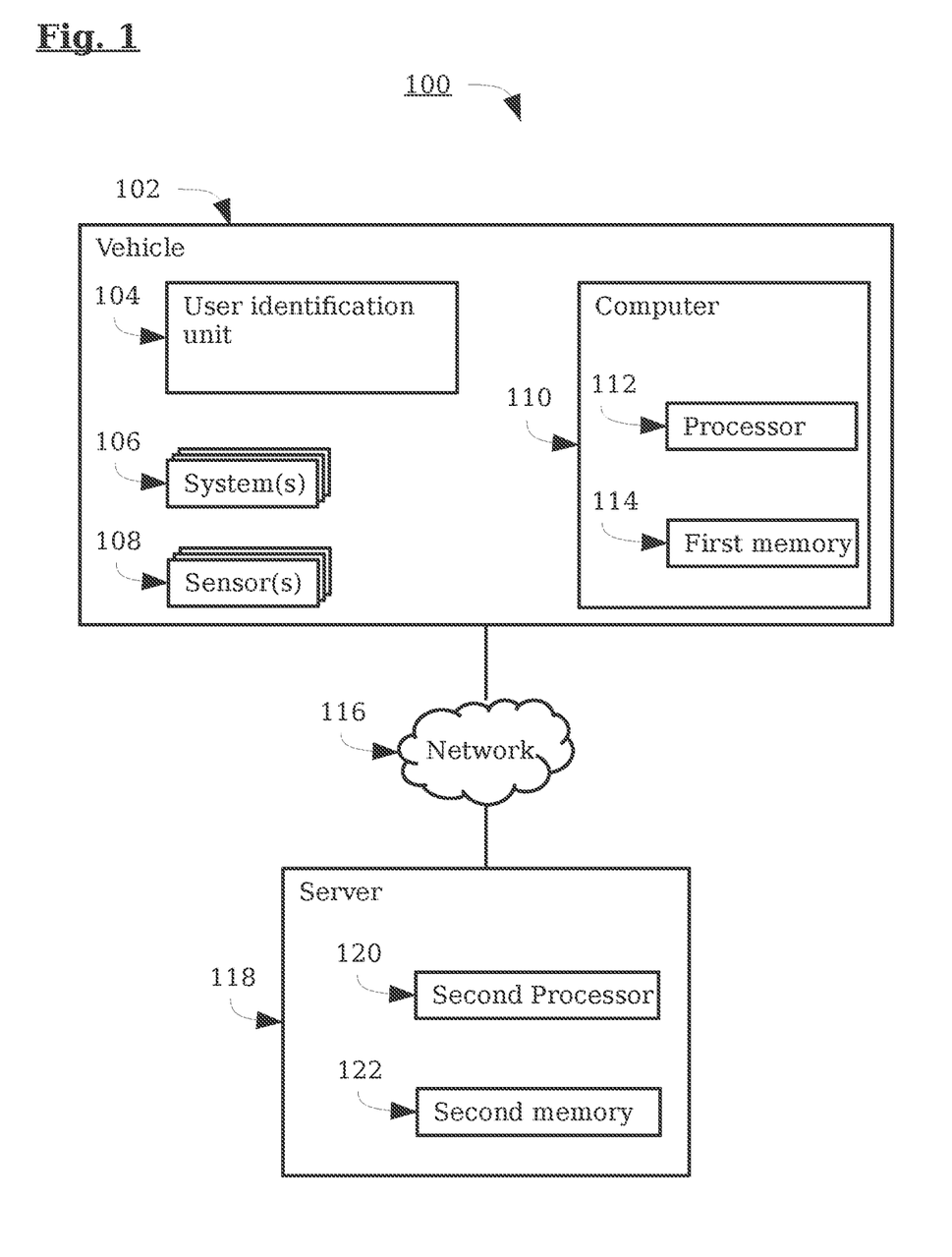
FIG. 1 depicts a block diagram of a system for configuring one or more systems related to the operation of a vehicle according to one or more embodiments.

FIG. 1 depicts a block diagram of a system 100 for configuring one or more systems 106 related to the operation of a vehicle 102 according to one or more embodiments.

The vehicle 102 comprises a user identification unit 104. The user identification unit 104 is configured to identify a user of the vehicle 102 at a time when the user is about to initiate operation of the vehicle 102. The user may be identified by recognizing a token in possession of a user, for example an identification card, a key, or a mobile phone comprising an application wherein a user identification code is stored. The user identification unit 104 may communicate with the token, e.g. the mobile phone, by electric communication via a plug interface, e.g. Universal Serial Bus (USB), or by radio communication, such as by wireless local area network (WLAN), Bluetooth, or Near Field Communication (NFC). In embodiments, other known identification techniques may be used, such as fingerprint or other biometric identification.

The user of the vehicle may be in particular a driver. However, the system 100 may be configured to detect a plurality of users at the same time, such as the driver and one or more passengers. In an exemplary embodiment, the system 100 may identify the driver and the passenger on the front passenger seat and configure their respective seats based on their respective generic settings, according to an embodiment of the present disclosure.

The systems 106 in the vehicle 102 may be all devices that are configurable via user-specific settings. This may comprise, e.g., an audio system, a heating, ventilation, and air conditioning (HVAC) system, a driver's seat and passenger seats, mirrors, and a navigation system. In embodiments, alternatively or additionally to the devices, services executed on a network-accessible server may be configured according to the present disclosure. Method steps and properties to devices are also applicable to all devices, services, and other systems.

The computer 110 comprises a processor 112 and a first memory 114. The processor 112 is configured to execute the method according to embodiments of the present disclosure. The first memory 114 may be a non-volatile memory and be configured to store first data representing mapping rules. The mapping rules establish a relation between the generic settings and vehicle-specific settings. For example, a user may set a height of a seat using an electric servo motor, within a predefined range and at a predefined step size. A detector comprised in the servo motor may determine the current position, usually in a measurement unit related to the servo motor, e.g., steps. This position forms part of the vehicle-specific settings and is transformed, by the processor 112, into a corresponding generic setting. In the present example, the corresponding generic setting would be the distance between the seat surface and an imaginary point within the vehicle interior at a height at which the eyes of the user should be situated to allow him to see traffic around the vehicle 102. This is particularly relevant if the user is the driver.

If the user uses the system 100 of the present disclosure for the first time, he will set the height of the seat manually. Therefore, he will simply have the servo motor drive up or down until his eyes are at an appropriate height. Based on the vehicle-specific position information, and using the mapping rules, the computer 110 then calculates the corresponding generic setting, i.e., the distance between the seat surface and the aforementioned imaginary point within the vehicle interior. This constitutes the generic data, and in the present example, an anatomic information about the user. This information is then stored in the second memory 122.

If the user is subsequently using a second vehicle (not shown), a second computer comprised in the second vehicle performs the inverse calculation: It transforms the generic information, using the mapping rules specific to the second vehicle, into vehicle specific data. Then, the seat is configured, i.e. the height is set accordingly. Thereby, the seat in the second vehicle is automatically set in a way that corresponds to the driver's need.

Another example may be the volume of a sound system. If a driver is first using a first vehicle that is equipped with a comparably powerful sound system and sets the volume to an intermediate value, e.g. 50/100 on a scale specific to the first vehicle, then the mapping rules in the first vehicle may allow transforming that value by calculating the sound pressure level in decibels. If the user is then switching to a second vehicle with a less powerful sound system, the computer 110 of the second vehicle may find that the value corresponds to a value of, e.g., 90/100 on a scale specific to the second vehicle. According to an embodiment, the audio system is then configured with this setting.

In other exemplary embodiments, the generic setting need not be expressed as a physical quantity in physical units. A value in arbitrary units may be sufficient, as long as it does not depend on the vehicle.

The one or more sensors 108 in the vehicle may be a sensor for any physical quantity in the vehicle or its surroundings. For example, the sensor 108 may be a configured to detect an exterior temperature. The computer 110 receives an input signal from the sensor 108. The signal may form part of the vehicle-specific data. If for example, a user tends to open the roof of a convertible when the temperature exceeds a threshold value, then both the state of the roof and the exterior temperature may be saved in the second memory 122. The data may be processed on the server 118, and a relation between both quantities may be determined automatically, leading to a determination of the threshold temperature. If the driver is next initiating operation of a convertible, the setting is applied automatically. If this is, e.g., a convertible the driver has never driven before, he thereby need not search for the corresponding button or switch in the vehicle.

The generic settings may further comprise a user-specified setting indicative of whether the user wishes automatic configuration of a particular system or not.

The server 118 is a computer accessible via the network 116, and configured to store the generic settings in the second memory 112 comprised in the server 118. It also possesses a second processor 120 that may be executing steps of the aforementioned calculations, and in particular steps of the method described with reference to FIG. 4. The server 118 may identify a vehicle using an unambiguous identifier, such as the vehicle's serial number.

In an alternative embodiment, the server 118 may be a mobile device. The network may be wireless local area network, Bluetooth, Near Field Communication or any other computer network connection known in the art.

Figure 2:
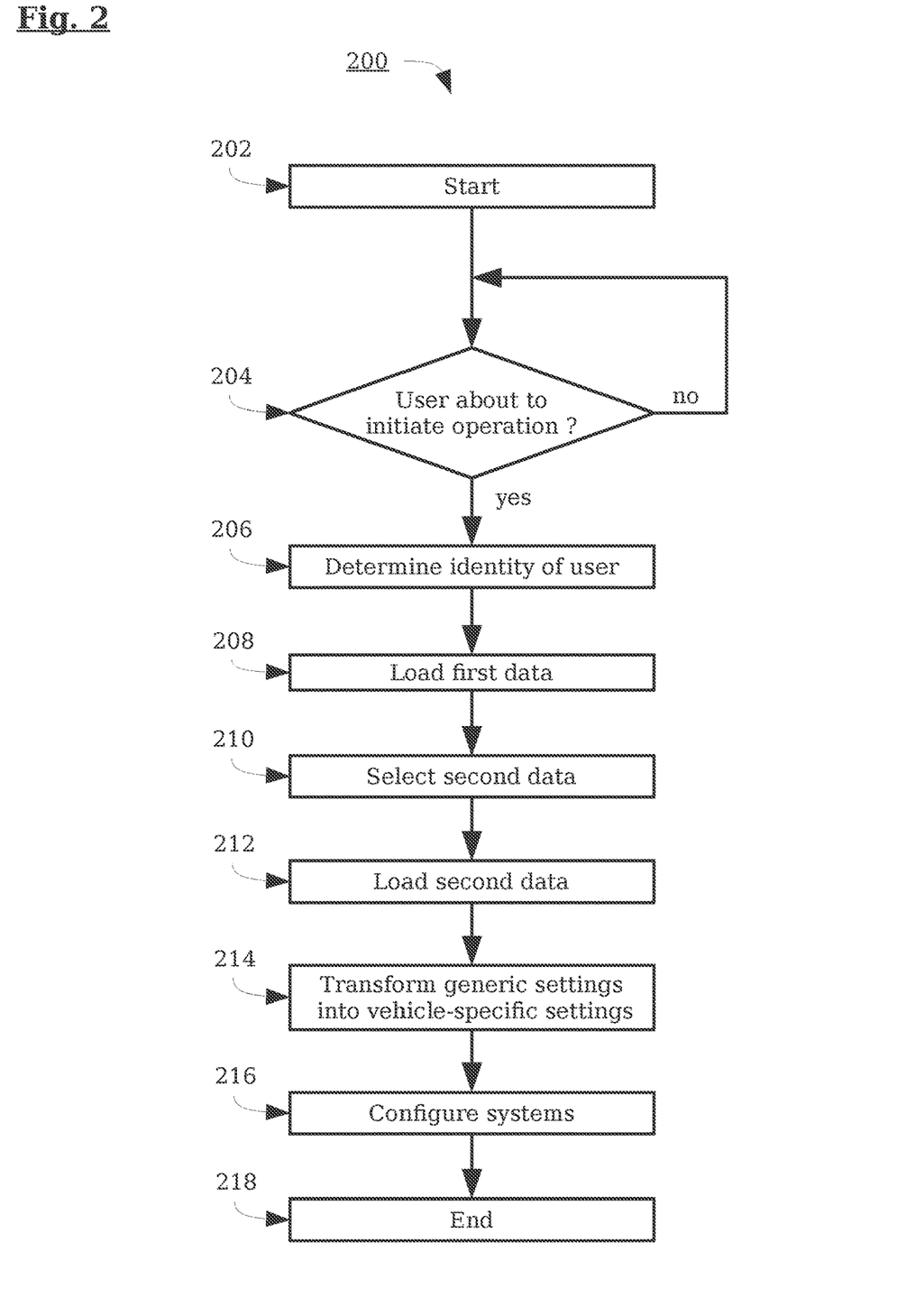
FIG. 2 depicts a flow chart of a process for configuring one or more systems related to the operation of a vehicle according to one or more embodiments.

FIG. 2 depicts a flow chart of a process 200 for configuring one or more systems related to the operation of a vehicle according to one or more embodiments. At the start 202, the vehicle is typically parked. If at block 204, the computer 110 receives an indication that a user is about to initiate operation of the car, it determines 206 the identity of the user, for example using a mobile device of the user, on which a suitable application is saved. Subsequently, the first data, representing the mapping rules, are loaded 208 by the computer 110 from the first memory 114. In this exemplary embodiment, the first memory 114 is comprised in the vehicle. The second data, representing generic settings, are loaded 212 from the second memory 122. The second memory 122 may be comprised in the mobile device of the user. Thereby, the data are available without a connection to the internet. In an alternative embodiment, the first and/or second memories may be on a server 118. This facilitates easier maintenance of the software. At block 210, the second data are selected based on the identity of the user, so that a set of second data, representative of his generic settings, is made available for transformation. At block 214, the computer 110, or alternatively, the server 118, transforms the generic settings into vehicle-specific settings, based on the mapping rules, either using a functional relation between the generic settings and the vehicle-specific settings, or by lookup in a mapping table. This may include limiting the value. If, for example, transforming the generic settings into vehicle specific settings yields a value in excess of the maximum available value in the vehicle, the value is set to the maximum. At block 216, the devices are configured according to the vehicle-specific values. After configuration is finished 218, no further steps are undertaken to configure the devices. The user may manually modify the settings.

Figure 3:
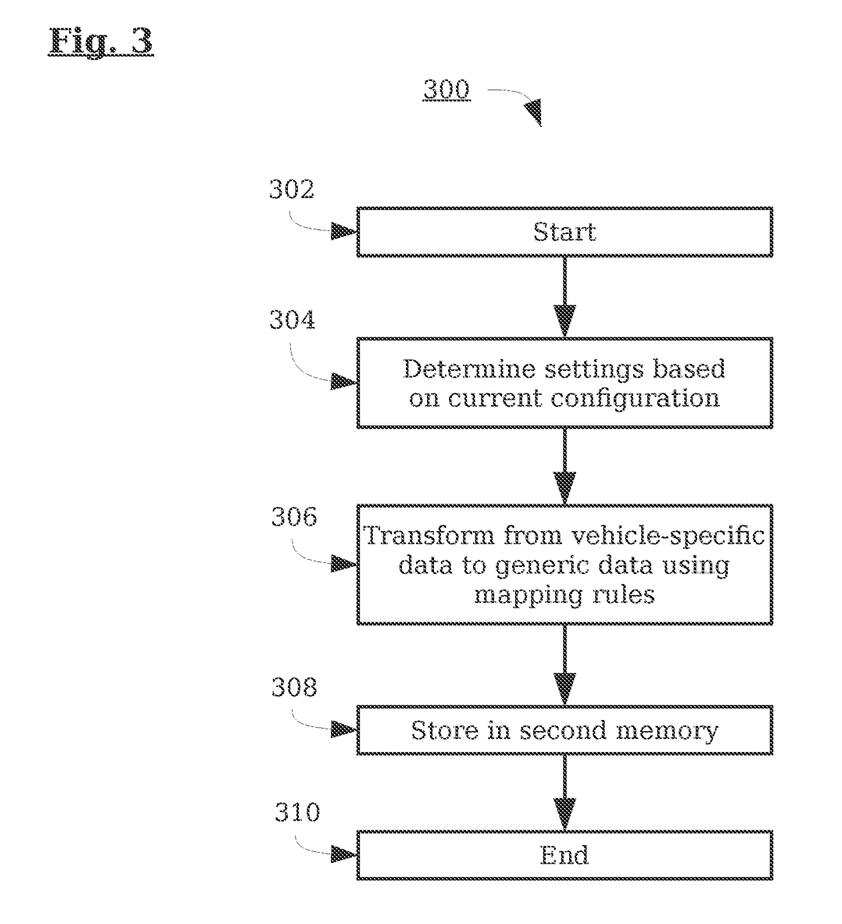
FIG. 3 depicts a flow chart of a process for storing generic settings according to one or more embodiments.

FIG. 3 depicts a flow chart of a process 300 for storing generic settings according to one or more embodiments. The process 300 starts at block 302. At block 304, the vehicle-specific settings are determined by receiving the input data from the systems. For example, a seat may send the data from the servo motors indicative of the position of the elements of the seat. At block 306, the settings are transformed from vehicle-specific settings to generic settings using the mapping rules. The same functional relations and/or mapping tables are applied as in block 214, however, they are inverted. In case of learning algorithms, the changed settings are used as training data. At block 308, the data are saved in the second memory. At block 310, the process ends and the data are available to be used in another vehicle.

The process may either be executed once at the end of operation of the vehicle, or repeatedly during operation. Alternatively, the configuration of the system may be recorded continuously, and the settings that were used with the longest duration are transformed and saved.

Figure 4:
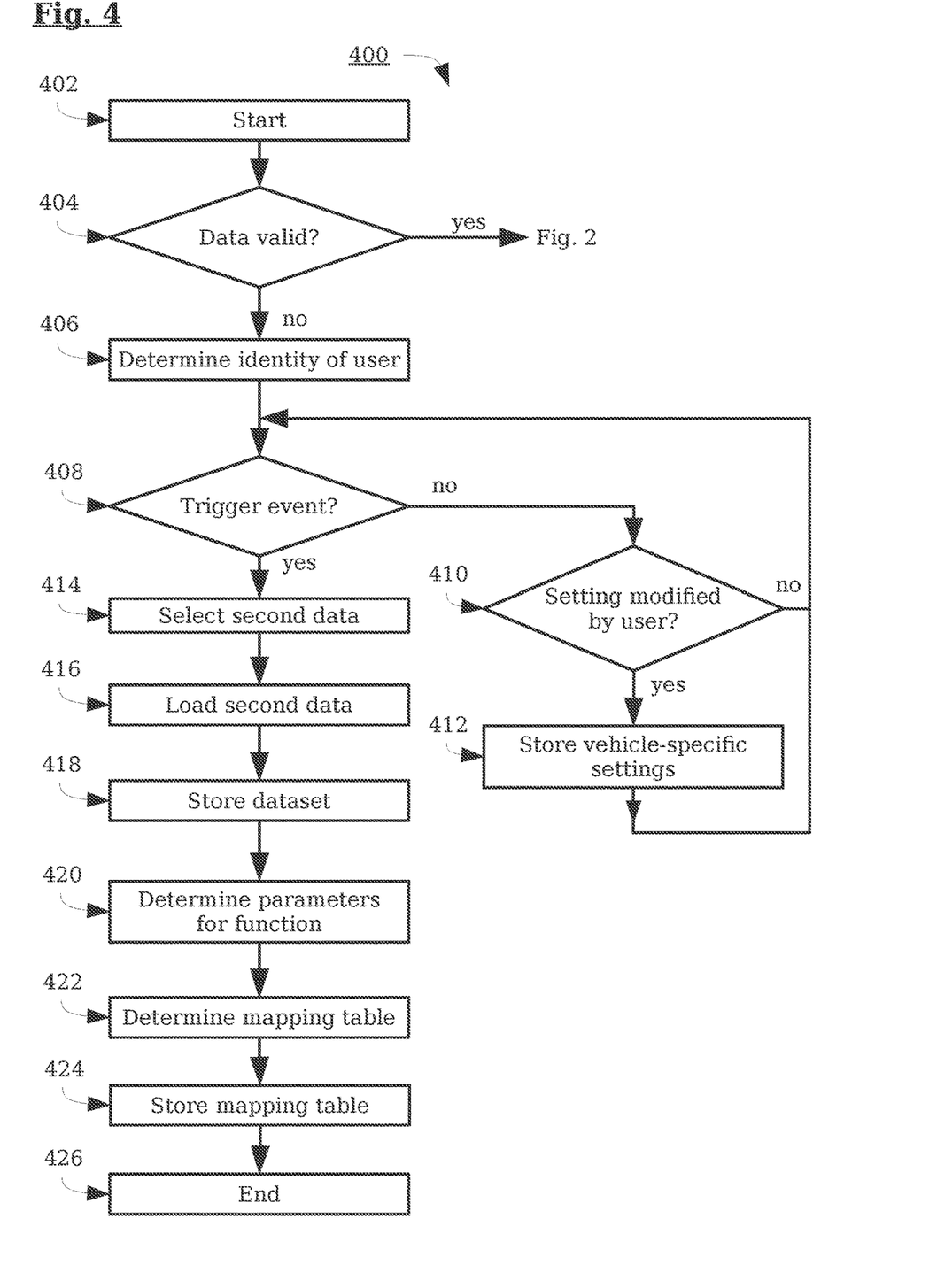
FIG. 4 depicts a flow chart of a process for determining a mapping rule according to one or more embodiments.

FIG. 4 depicts a flow chart of a process 400 for determining a mapping rule according to one or more embodiments. The process, a calibration process relating to the vehicle, is to be executed on systems for which no predetermined mapping rules are available. This may be the case either of systems, vehicles, or system-vehicle combinations of a newly designed type, that has not been on the market yet, or modified versions of systems and/or vehicles for which the mapping rules are no longer valid, or systems and/or vehicles of a type of which no vehicles have been equipped with the system 100 yet.

In the case of a vehicle of a new vehicle type (e.g. a new vehicle model), the process 400 is to be executed for each system comprised in or used by the vehicle if there are no mapping rules for the system-vehicle combination yet.

At block 402, the process begins. At block 404, the process determines if the data are valid. If the mapping data for the vehicle are valid, the systems are configured using the process of FIG. 2. If there are no mapping data available, no automatic configuration according to process 200 is possible. An identity of the user is determined 406. The user is likely to configure the systems manually. For example, if the user is the driver, he will likely adjust the seat if necessary. The system 100 awaits these manual configurations before continuing. Therefore, a trigger event is awaited. A trigger event may be a predefined time elapsing after beginning operation of the vehicle or after the vehicle has begun moving. A trigger event may also correspond to the termination of using the vehicle. A trigger event may also consist in a user input indicating that configuration has been finished.

At block 408, the process determines if a trigger event has occurred. Before the trigger event occurs, at block 410 it is verified whether the vehicle-specific settings were modified by the user. If this is the case, they are stored 412 in the first memory. The loop continues to collect vehicle-specific settings for one or more systems.

Once the trigger event has happened, the second data representative of the generic settings are selected 414 based on the identity of the user. The second data are loaded 416 from the second memory device. A dataset is formed that represents a pair of these two items of data. The dataset is stored 418 in a third memory comprised in a network-accessible server. The server collects the data related to the same type of system, which may be identified by a product number, for a combination of product numbers of the vehicle and the system. Thereby, the server collects the datasets from a plurality of users of a vehicle of the same type, for whom generic settings are already stored in the second memory. Each user who has already used the system on another vehicle, and for whom the anatomic data are already saved on the server, contributes a dataset for the determination of the mapping rules when he configures the new system or the system in the new vehicle. Once a sufficient number of datasets are stored in the third memory, a processor determines the mapping rules using a predetermined functional relation between the generic settings and the vehicle-specific settings. In the illustrative example of the height of a seat, the data sets represent pairs of anatomic data of the users (height when seated) and system-specific settings (position of a servo motor). The functional relation may be a linear relation, so that coefficients (a slope and an offset) are determined based on the plurality of data sets from the plurality of users, e.g. using a linear regression. Additional known methods of data analysis, such as exclusion of outlying values, or calculation of a confidence value, may be applied. Subsequently, a mapping table is determined based on the functional relation, such that for each possible position of the servo motor, the corresponding generic setting is determined 422. The generic settings are stored 424 as a mapping rule in the first memory. The method ends at block 426. Steps 422 and 424 may be conditional on the confidence value of step 420 reaching a predetermined threshold. Once the mapping rules are stored, all systems (or system-vehicle combinations) of the same type are configurable by method 200 (FIG. 2). Although in this exemplary embodiment, a functional relation is used to determine the mapping rules, other methods, in particular the training of an artificial neural network, can be used as well.

Furthermore, method 400 may be executed repeatedly, thereby collecting more data sets, to improve the accuracy and reliability of the mapping rules. Method 400 constitutes a fully automatic, self-learning process for determining mapping rules without any user intervention. In addition, a user may be able to modify the mapping rules at any moment.

REFERENCE SIGNS

100 System
102 Vehicle
104 User identification unit
106 System(s) in vehicle
108 Sensor(s)
110 Computer
112 Processor
114 First memory device
116 Network
118 Server
120 Second processor
122 Second memory device
200 Process for configuring one or more systems
202-218 Steps of process 200
300 Process for storing generic settings
302-310 Steps of process 300
400 Process for determining a mapping rule
402-426 Steps of process 400

The invention claimed is:

1. A computer-implemented method for configuring one or more systems related to the operation of a vehicle, the computer-implemented method comprising:
in response to receiving input data indicative of a user being about to initiate an operation of the vehicle:
determining an identity of the user,
loading first data representative of one or more mapping rules from a first memory device,
selecting and loading second data representative of one or more generic settings from a second memory device, wherein selecting the second data is based on the identity of the user,
transforming, based on the mapping rules, the generic settings into vehicle-specific settings, wherein transforming the generic settings based on the mapping rules comprises translating a value from a generic scale to a vehicle-specific scale by an analytic function or a mapping table, or executing a heuristic algorithm or an artificial neural network, and
configuring, based on the vehicle-specific settings, the one or more systems related to the operation of the vehicle.

2. The computer-implemented method of claim 1, wherein the second memory device is a remote network-accessible storage and/or comprised in a mobile device.

3. The computer-implemented method of claim 1, further comprising:
in response to receiving an input indicative of the user modifying vehicle-specific settings related to the one or more systems:
transforming the modified vehicle-specific settings into modified generic settings based on the mapping rules, and
storing data representative of the modified generic settings in the second memory device.

4. The computer-implemented method of claim 1, further comprising:
periodically and/or in response to receiving an input indicative of the user terminating the operation of the vehicle:
determining current vehicle-specific settings based on a current configuration of the one or more systems,
transforming the current vehicle-specific settings into modified generic settings based on the mapping rules, and
storing data representative of the modified generic settings in the second memory device.

5. The computer-implemented method of claim 1, wherein the first memory device is comprised in the vehicle, in a network-accessible server, or a mobile device.

6. The computer-implemented method of claim 1, wherein configuring the one or more systems is further based on data related to a context of the vehicle.

7. The computer-implemented method of claim 1, wherein configuring the one or more systems is further based on data generated by a sensor comprised in or attached to the vehicle.

8. A computer-implemented method for configuring one or more systems related to the operation of a vehicle, the computer-implemented method comprising:
in response to receiving input data indicative of a user being about to initiate an operation of the vehicle:
determining an identity of the user,
loading first data representative of one or more mapping rules from a first memory device,
selecting and loading second data representative of one or more generic settings from a second memory device, wherein selecting the second data is based on the identity of the user,
transforming, based on the mapping rules, the generic settings into vehicle-specific settings, and
configuring, based on the vehicle-specific settings, the one or more systems related to the operation of the vehicle;
wherein the step of transforming the generic settings into vehicle-specific settings is executed by a network-accessible remote computer, by a mobile remote computing device, or by a computer comprised within or attached to the vehicle.

9. The computer-implemented method of claim 1, wherein the generic settings comprise one or more of:
multimedia system settings,
motor settings,
seat settings,
navigation system settings,
language settings of a user interface, and
heating and/or air conditioning settings.

10. The computer-implemented method of claim 1, further comprising:
determining whether the first data representing valid mapping rules are available; and
in response to a determination that the first data representing valid mapping rules are not available:
determining the identity of the user,
storing vehicle-specific settings in the first memory device in response to the settings being applied or modified by the user,
in response to detecting a trigger event, wherein the trigger event comprises one out of receiving a predetermined user input, a predetermined time period elapsing, and receiving an indication of the user terminating the operation of the vehicle:
selecting and loading second data representative of one or more generic settings from a second memory device, wherein selecting the data is based on the identity of the user,
storing a dataset comprising values representative of one or more generic settings and corresponding vehicle-specific settings in a third memory comprised in a network-accessible server,
determining, by the network-accessible server, mapping rules for transforming generic settings into corresponding ones of the vehicle-specific settings based on the values, and
storing the mapping rules in the first memory.

11. The computer-implemented method of claim 10, wherein determining the mapping rules comprises:
determining, by the network-accessible server, a set of parameters for a predetermined functional relation, such that the functional relation approximates the dataset, and
determining, by the network-accessible server, a mapping table based on the functional relation.

12. The computer-implemented method of claim 11, wherein the set of parameters is determined using a linear regression.

13. The computer-implemented method of claim 1, wherein
selecting and loading second data representative of one or more generic settings from a second memory device is further based on third data indicative of a selection by the user whether or not a configuration is to be affected.

14. The computer-implemented method of claim 1, further comprising:
determining whether the second data representing generic settings are available; and
in response to a determination that the second data representing generic settings are not available:
determining whether data related to preferences and/or properties of the user are available;
in response to a determination that data related to preferences and/or properties of the user are available:
transforming the data related to preferences and/or properties of the user into generic settings; and
storing the generic settings in the second memory device.

15. A system for configuring one or more systems related to the operation of a vehicle, the system comprising:
a processor configured to:
in response to receiving input data indicative of a user being about to initiate an operation of the vehicle:
determine an identity of the user,
load, from a first memory device, first data representative of one or more mapping rules,
select and load, from a second memory device, second data representative of one or more generic settings, wherein selecting the data is based on the identity of the user,
transform, based on the mapping rules, the generic settings into vehicle-specific settings, and
configure, based on the vehicle-specific settings, the one or more systems of the vehicle; and
in response to receiving an input indicative of the user modifying vehicle-specific settings related to the one or more systems:
transform the vehicle-specific settings into modified generic settings based on the mapping rules, and
store data representative of the modified generic settings in the second memory device.

16. The system of claim 15,
wherein:
the first memory device is comprised in a network accessible server, in a mobile device, or in the computing device, and
the second memory device is a remote network-accessible storage and/or comprised in a mobile device.

17. The system of claim 15,
wherein configuring the one or more systems is further based on data related to a context of the vehicle and/or data generated by a sensor comprised in or attached to the vehicle.

18. The system of claim 15, further comprising:
a first computing device comprised in a vehicle; and
a second computing device being remotely accessible;
wherein:
the first computing device is configured to:
determine an identity of the user; and
configure, based on the vehicle-specific settings, the one or more devices comprised in the vehicle; and
the second computing device is configured to, in response to receiving an input indicative of the user being about to initiate an operation of the vehicle:
load first data representative of one or more mapping rules from a first memory device,
select and load second data representative of one or more generic settings, wherein selecting the data is based on the identity of the user from a second memory device, and
transform, based on the mapping rules, the generic settings into vehicle-specific settings; and
the second computing device is configured to, in response to receiving an input indicative of the user modifying vehicle-specific settings related to the one or more systems:
transform the vehicle-specific settings into modified generic settings based on the mapping rules, and
store data representative of the modified generic settings in the second memory device.

19. The computer-implemented method of claim 1, wherein the one or more mapping rules comprise mapping tables, heuristic algorithms, artificial neural networks, and/or analytic functions.

* * * * *